United States Patent
Ayyar et al.

(10) Patent No.: US 6,601,166 B1
(45) Date of Patent: Jul. 29, 2003

(54) MECHANISM FOR BOOTING A COMPUTER THROUGH A NETWORK

(75) Inventors: Mani Ayyar, Cupertino, CA (US); Sham Datta, Hillsboro, OR (US); Andrew Fish, Olympia, WA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/471,792

(22) Filed: Dec. 23, 1999

(51) Int. Cl.⁷ .............................................. G06F 9/445
(52) U.S. Cl. ......................................... 713/2; 709/222
(58) Field of Search ............................. 713/2; 709/220, 709/222

(56) References Cited

U.S. PATENT DOCUMENTS

| | | | | |
|---|---|---|---|---|
| 5,828,888 A | * | 10/1998 | Kozaki et al. | 717/170 |
| 5,948,101 A | * | 9/1999 | David et al. | 713/2 |
| 5,974,547 A | * | 10/1999 | Klimenko | 713/2 |
| 6,345,294 B1 | * | 2/2002 | O'Toole et al. | 709/222 |
| 6,421,777 B1 | * | 7/2002 | Pierre-Louis et al. | 713/2 |

* cited by examiner

*Primary Examiner*—Thomas M. Heckler
(74) *Attorney, Agent, or Firm*—Blakely, Sokoloff, Taylor & Zafman LLP

(57) ABSTRACT

A mechanism is provided for booting a computer system that is capable of implementing different instruction set architectures, through a network. An embodiment of the invention includes a network controller implemented for a first ISA and a processor capable of implementing programs written in a second ISA as well as programs written in the first ISA. Following preliminary boot operations provided through non-volatile system memory, a network boot program provided by the network controller is implemented. The boot program requests the non-volatile system memory for an indication of the operating system to be loaded and generates a boot request for the indicated operating system. When the indicated operating system is written in the second ISA, the boot program loads the OS to a specified location in system memory and sends the processor into a mode suitable for executing the second ISA.

19 Claims, 5 Drawing Sheets

MECHANISM FOR BOOTING A COMPUTER THROUGH A NETWORK

BACKGROUND OF THE INVENTION

1. Technical Field

The present invention relates to the field of computer systems, and in particular, to systems and methods for bootstrapping computer systems.

2. Background Art

Currently available network technology allows different network nodes, such as various types of computers, to exchange information over a network medium. A networked computer may be designated as a client or a server, depending on its function in the network. For example, servers are relatively powerful computers that can provide programs and data to other computers, e.g. clients, through the network. Servers may provide clients with application programs and in some instances, the operating systems on which the application programs run. In the latter case, the client is configured to retrieve the operating system through its network controller when the client is booted.

A network controller typically includes a read-only-memory (ROM) to store programs governing network-related operations, including network boot operations. When the network controller is designated as the boot device, the client executes a boot program in the network controller ROM to access a suitable operating system from a server on the network. The network controller and its programs are designed for a particular instruction set architecture (ISA), to provide an effective interface between the client and the network.

For currently available network controllers, the network boot operation includes sending a broadcast message over the network to indicate the type of operating system to be loaded. The type of operating system is specified in the network controller when it is manufactured. For example, the network controller's ROM may specify that the associated client computer is to be booted with an operating system suitable for the IA32 ISA, such as the Windows '98 or Windows NT operating systems from Microsoft Corporation of Redmond, Wash.

IA64 processors from Intel® Corporation of Santa Clara Calif., can implement operating systems written in different ISAs. Because currently available network controllers support network booting of operating systems based on a single ISA, they limit the options for network booting of IA64 processors and any other processors that are capable of implementing different ISAs. Providing the computer with a different network controller for each ISA it is capable of implementing solves this problem, but it increases the cost of the network connection hardware significantly. In addition, it requires the development of significant network infrastructure for each ISA, rather than leveraging the infrastructure available for more established ISAs. For example, there has already been significant investment in the development of platform resources such as network controllers based on the IA32 ISA. The IA64 ISA is relatively new, and has not had the benefit of the years of investment devoted to the IA32 ISA.

The present invention addresses these and other issues associated with loading programs from a network.

SUMMARY OF THE INVENTION

The present invention provides a mechanism for loading a computer with programs written in different ISAs, using the same network controller. The mechanism may be used to boot a computer with operating systems based on different ISAs.

A computer system in accordance with the present invention includes a processor, a non-volatile memory, and a network controller. The non-volatile memory stores a first boot routine and the network controller stores a second boot routine. When indicated, the processor executes the second boot routine to retrieve a client architecture indication from the non-volatile memory and generate a boot request for the network that includes the client architecture indicator.

For one embodiment of the invention, the second boot routine is written in a first ISA and the client architecture indicator indicates an operating system that is written in a second ISA. The second boot routine includes an interrupt that retrieves the client architecture indicator from a firmware module stored in the non-volatile memory.

A method for booting a processor from a network in accordance with the present invention includes detecting a reset signal, retrieving an indication of an operating system to be booted from a memory location, and generating a network boot request based on the indication. The indication may also be provided by a user in response to a prompt.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

Figure 1:
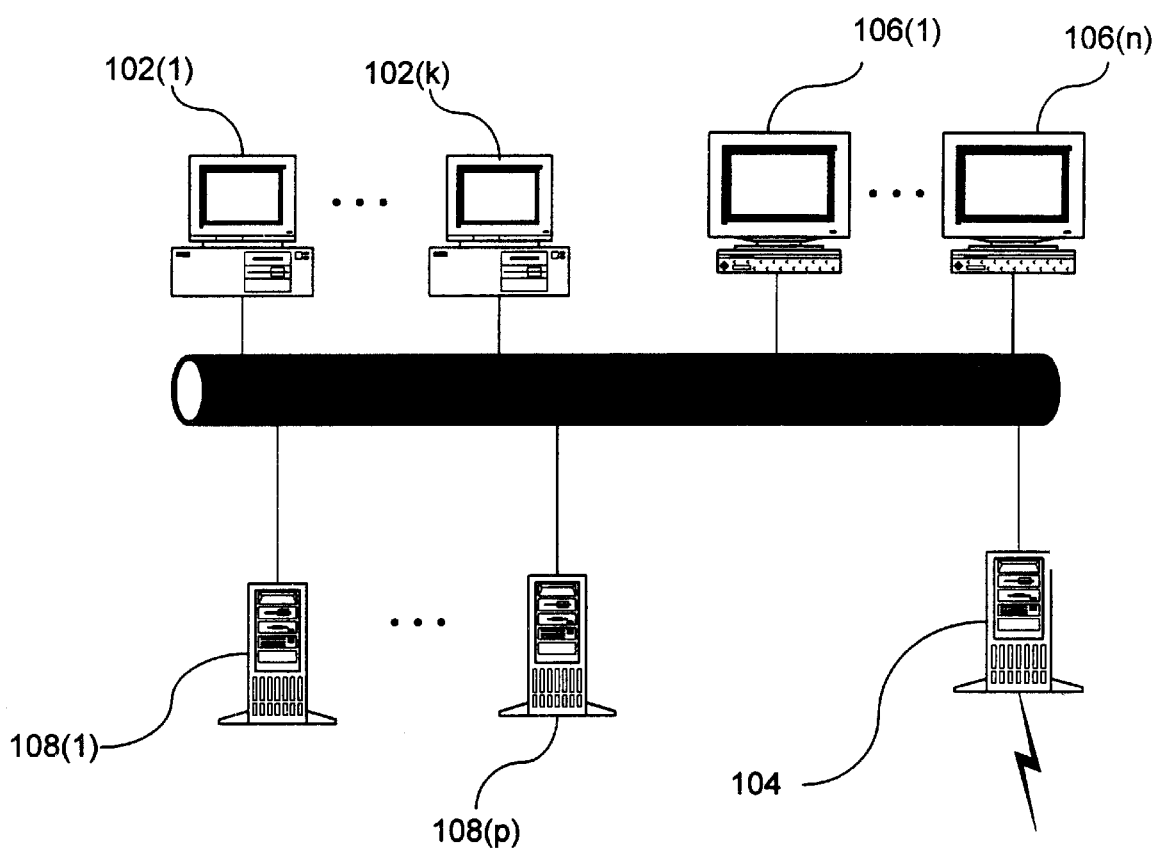
FIGS. 1 represents one embodiment of a computer network in which the present invention may be implemented.

FIG. 1 represents a network 100 in which the present invention may be used. For purposes of illustration, network 100 includes one or more personal computers (PC) 102(1) –102(k) and workstations 106(1)–106(n), and one or more servers 108(1)–108(p). In the following discussion, indices are dropped from reference numbers unless they are necessary to avoid ambiguity. PCs 102, workstations 104, and servers 108 are referred to generically as the nodes of network 100. Network 100 may itself include subgroups of networked nodes. A router 104 is also shown in FIG. 1 to connect network 100 with other networks such as, for example, the internet.

The nodes of network 100 may implement a variety of ISAs and their associated operating systems. In addition, particular nodes on network 100 may be capable of implementing more than one ISA. For example, IA64 processors of Intel® Corporation, Santa Clara Calif., may implement programs written for both the IA64 and IA32 ISAs. One embodiment of the present invention provides a flexible mechanism for booting such devices to an IA32 or an IA64 operating system through network 100. The present invention does not require a particular configuration for network 100 or a particular combination of network nodes.

A boot operation begins when a reset signal is asserted in a client such as workstation 104. The reset signal may be generated locally or remotely, i.e. by the client or by another node on the network. In response to the reset signal, processor and platform resources in workstation 104 are initialized and an operating system is loaded into its memory. For network boot operations, the operating system (or a portion of the operating system) is provided to workstation 104 from another resource on the network in response to a boot request generated by workstation 104. The boot request, which indicates the node to be booted and the type of operating system required, is typically broadcast to the nodes of network 100. A node having the requested operating system responds to the boot request, and provides the indicated operating system. For example, server 108(1) may provide an IA64 operating system in response to a boot request from workstation 104 indicating that it is to be booted as an IA64 system. Server 108(p) may provide an IA32 operating system to workstation 104 if the boot request indicates it is to be booted as an IA32 system. The boot request indicates the operating system to be loaded on the requesting device. The present invention provides a flexible method for generating boot request message appropriate for different operating systems, using the same network controller.

Figure 2:
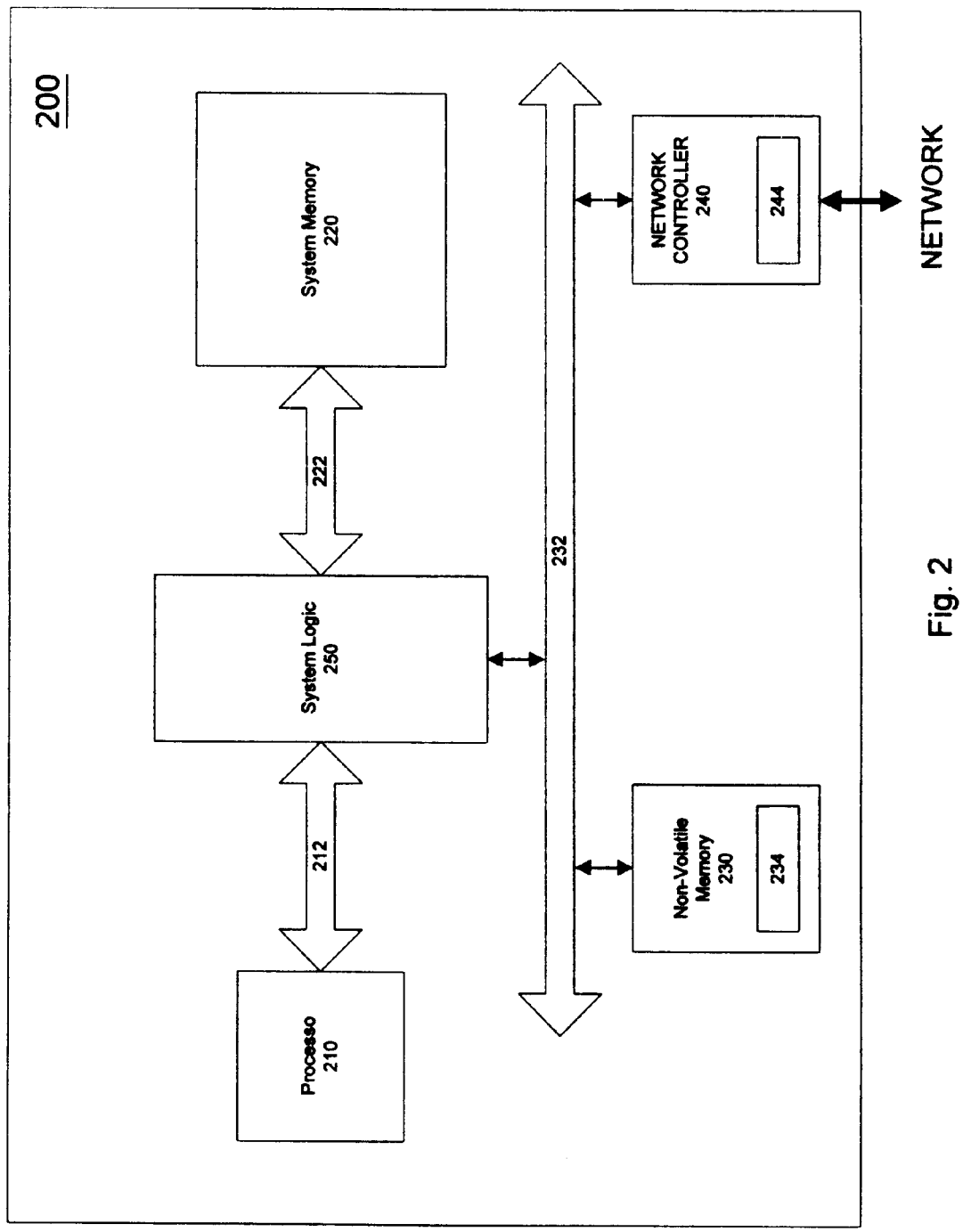
FIG. 2 is a block diagram of one embodiment of a computer system that implements the present invention.

FIG. 2 is a block level diagram of one embodiment of a computer system 200 that implements the present invention. Computer system 200 represents, for example, one of the nodes on network 100. Computer system 200 includes one or more processors 210, a system memory 220, a non-volatile memory 230, and a network controller 240, which communicate through a system logic device 250. Processor 210 and memory system 220 are coupled to system logic 250 through buses 212 and 222, respectively. Non-volatile memory 230 and network controller 240 are coupled to system logic through a bus 232. Network controller 240 provides a connection between computer system 200 and a network such as network 100.

For the disclosed embodiment of computer system 200, non-volatile memory 230 includes a first boot program 234. Code segments in first boot program 234 are implemented by processor 210 when computer system 200 is first reset, to test and initialize various resources in computer system 200. These include resources on the processor itself as well as platform level resources. Where system 200 includes multiple processors 210, one processor may be selected as a monarch or bootstrap processor to implement certain portions of the system-level initialization. When the testing/initialization procedure reaches a specified point, an operating system is loaded into system memory 220. The operating system may be provided from a peripheral device such as a hard disc drive, a floppy disc drive, or network controller 240.

The present invention supports the boot process when the operating system is provided through network controller 240. For one embodiment, first boot program 234 indicates a source for the operating system through a prioritized list. For example, first boot program 234 may include a configuration file, which specifies in order of preference, the devices from which the operating system may be provided. When network controller 240 is the first valid device indicated by the configuration file, the boot process is continued through a second boot program 244 in network controller 240.

When the boot process proceeds through second boot program 244, network controller 240 generates a boot request message to be broadcast over the network. The boot request message indicates the type of operating system to be loaded. For example, a network controller for the IA32 platform is typically hardwired to request an IA32 compatible operating system. That is, an operating system that is written in the IA32 ISA. The present invention supports a mechanism through which network controller 240 can be adjusted to indicate a specified operating system in the boot message it generates. In particular, a network controller designed for one platform may request an operating system designed for a different platform. As noted above, IA64 processors can implement both IA32 and IA64 operating systems. The present invention allows a network controller to indicate either operating system for the boot process. For example, a network controller designed for the IA32 platform can request either an IA32 or an IA64 operating system from the network.

Figure 3:
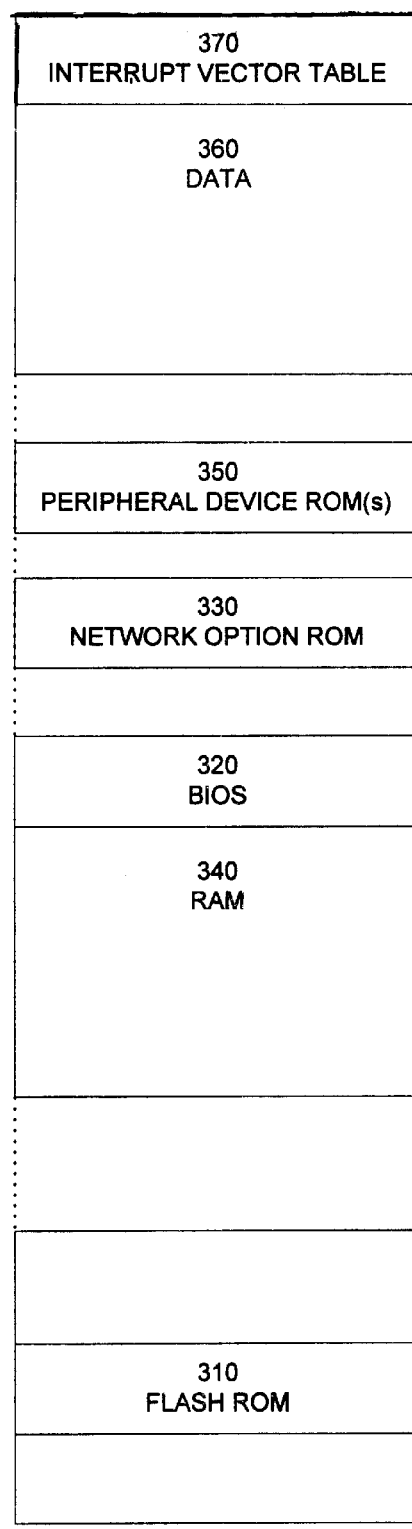
FIG. 3 is a block diagram representing a memory map of the computer system of FIG. 2.

FIG. 3 is a block diagram representing a memory map 300 of one embodiment of computer system 200. Memory map 300 includes address regions for a flash ROM 310, a BIOS 320, and a network option card (NOC) 330. Referring to FIG. 2, portions of first boot program 234 in non-volatile memory system 230 are mapped to flash ROM 310 and BIOS 320, and portions of second boot program 244 are mapped to NOC 330. Memory map 300 also includes address regions for random access memory (RAM) 340, additional peripheral device cards 350, DATA 360, and an interrupt vector table (IVT) 370. The contents of memory system 220 are mapped to the addresses in RAM 340, and certain system/configuration data may be mapped to addresses in DATA 360. IVT 370 stores pointers to different interrupt handlers, which are identified according to the type of interrupt received and the parameters specified in the interrupt.

For one embodiment of the invention, DATA 360 stores information to indicate which operating system is to be booted on computer system 200. This information is referred to as the client architecture byte(s) (CAB) and may be adjusted by the system user to indicate a preferred operating system. The CAB may be read and updated through various firmware modules, such as BIOS 320. For the exemplary IA64 system, the CAB may indicate that an IA32 or an IA64 operating system is to be booted. The CAB may be transferred between various code segments represented in memory map 300 through software interrupts.

For one embodiment of the invention, when the operating system to be booted is provided through the network, first boot program 234, e.g. flash ROM 310, implements a testing/initialization procedure and calls second boot program 244 (NOC 330) to load the operating system. Second boot program 244 issues a software interrupt to retrieve the CAB in DATA 360. The value of CAB indicates which operating system is to be loaded.

On the Itanium™ processor of Intel® Corporation, second boot program 244 may be written in IA32 code, which executes an INT instruction to access CAB data. For this embodiment, the IA32 INT instruction is trapped by an IA-64 trap handler. In response to a selected INT instruction, e.g. INT 15/d04F, the trap handler retrieves the CAB and provides it to second boot program 244. Other embodiments may implement different mechanisms for retrieving the CAB value.

Second boot program 244 uses the value of CAB to generate a boot request that specifies the type of operating system to be loaded and broadcasts this message on the network. If the CAB corresponds to the IA32 ISA, a suitable node on the network returns an IA32 operating system. If the CAB corresponds to the IA64 ISA, a suitable node on the network returns an IA64 operating system. In the latter case, additional IA32 code may be returned to the network controller to handle the loading of the IA64 operating system. For an IA32-based network controller 244, the additional code switches processor 210 to IA64 mode, once the transfer is complete.

Figure 4:
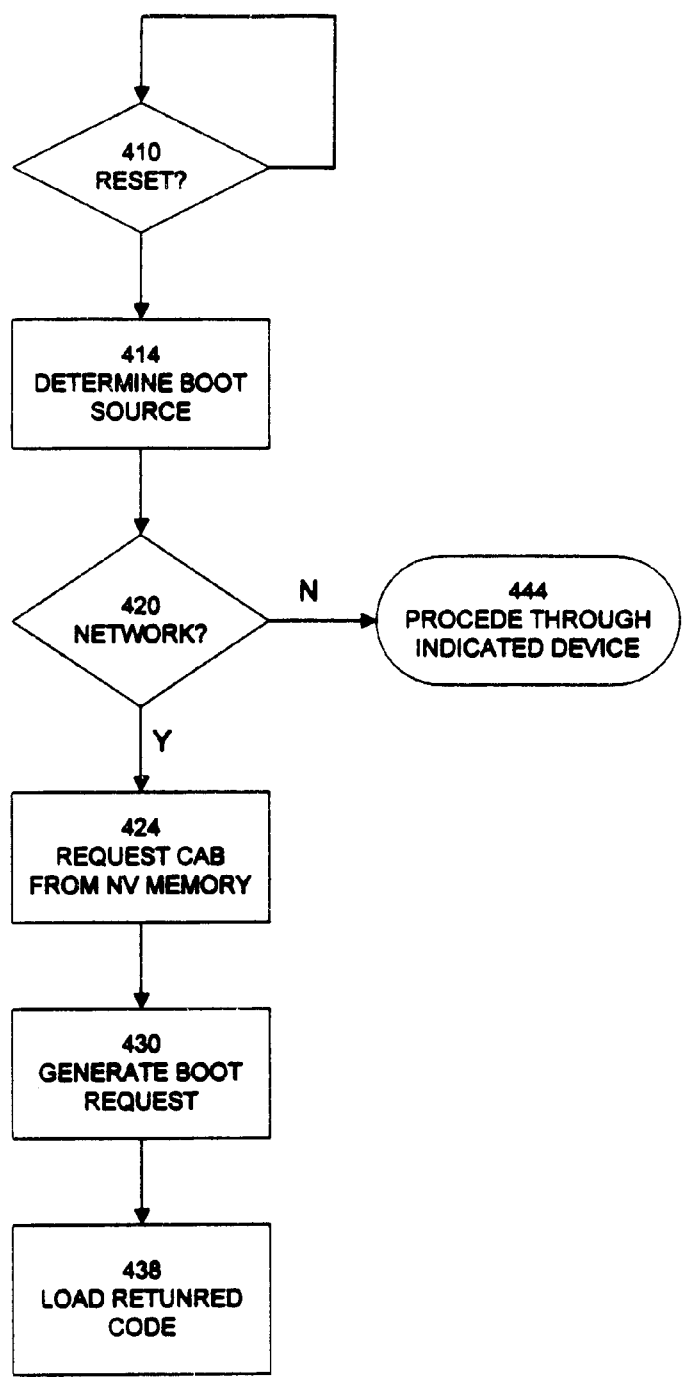
FIG. 4 is a flowchart representing one embodiment of a method in accordance with the present invention for booting a computer system from a network.

FIG. 4 is a flowchart representing a method 400 implemented by a computer system in accordance with the present invention. When a reset signal is detected 410, the computer system implements a boot process to initialize its processor and platform resources and, eventually, load the operating system (or a portion of the operating system) into its memory system. Processor and platform initialization operations are typically handled through routines in first boot program 234. As part of these operations, the computer system determines 414 which device will provide the operating system that is to be loaded into the memory system. If it is determined 420 that the network controller is to provide the operating system, i.e. the computer system is to be booted through the network, method 400 proceeds to generate an appropriate boot request. If a device other than the network controller provides the operating system, control passes 444 to the indicated device.

To generate an appropriate boot request, the type of operating system to be booted is first identified. Thus, a request is issued 424 to the non-volatile memory for an indication of the operating system to be loaded. For the disclosed embodiment of computer system 200 (or memory map 300), this information is represented by the CAB, which is stored in DATA 360 of non-volatile memory 230. Second boot program 244 may retrieve the CAB value through a software interrupt instruction. The interrupt includes parameters such as an interrupt type and offset, which identify the appropriate interrupt handler through IVT 370. The specified interrupt returns the value of CAB, which is used to generate 430 a boot request. The boot request is broadcast on the network to elicit the desired operating system code from another computer node, e.g. server 108. The OS code returned in response to the boot request is loaded 438 into the client's system memory.

Figure 5:
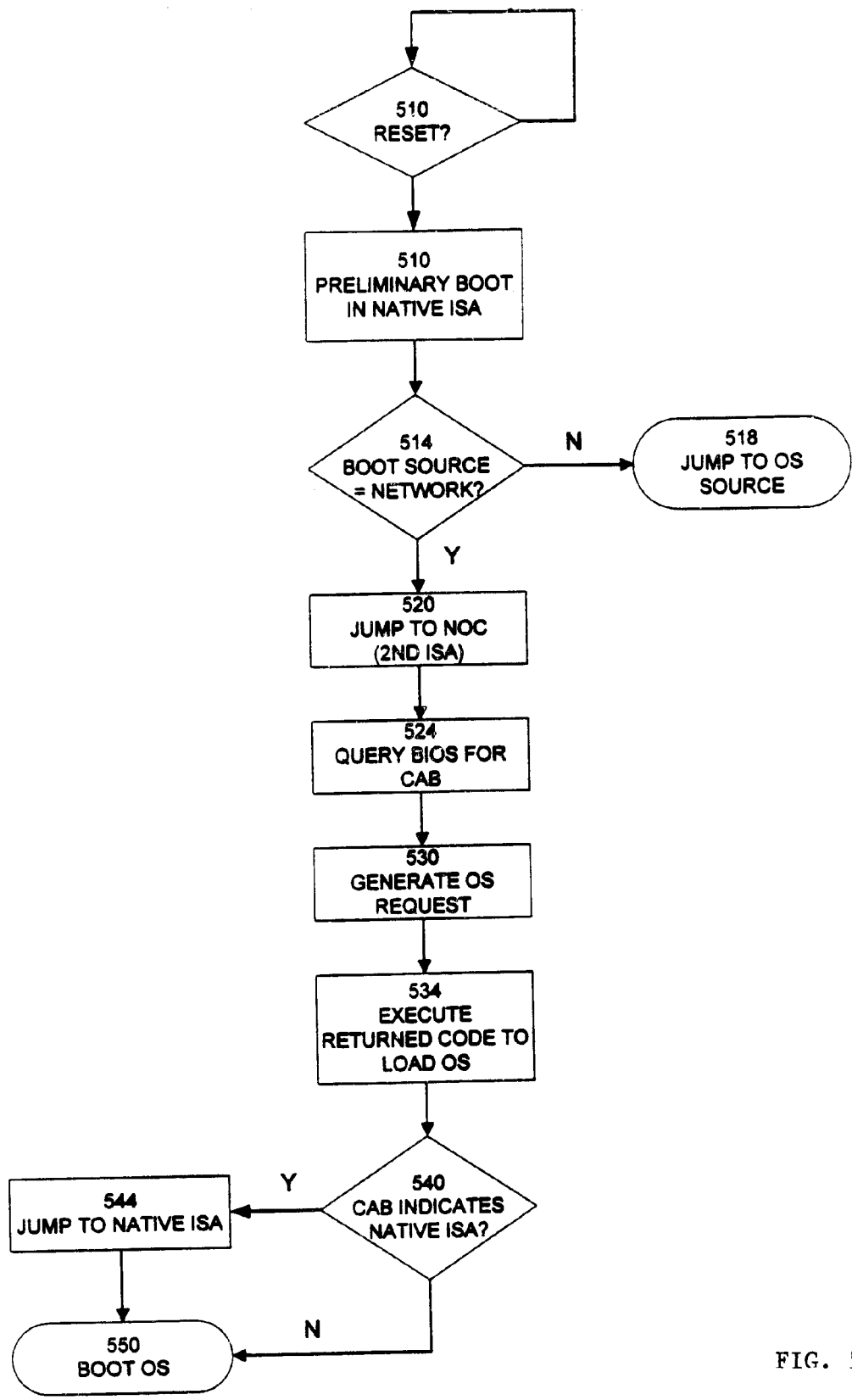
FIG. 5 is a flowchart representing one embodiment of a method for booting a computer system from a network to operating systems based on different ISAs.

FIG. 5 represents a more detailed flowchart of one embodiment of the method summarized in FIG. 4. When reset is detected 510, a preliminary boot procedure is executed 512 in the processor's native ISA, e.g. IA64, and a source for the OS to be loaded is determined 514. Depending on the implementation, the preliminary boot procedure may execute one or more code segments in a second ISA, e.g. IA32, as well. If the OS source is a device other than the NOC, method 500 jumps 518 to the appropriate device code. If the OS source is the NOC, method 500 jumps 520 to the boot program in the NOC. In order to preserve the significant investment in the second ISA, the NOC code and as well as that associated with other platform resources, is implemented in the second ISA.

The NOC boot program queries 524 the processor firmware (non-volatile memory 230) for the CAB. As noted above, this may be done through a software interrupt instruction. Parameters for an INT 15 Function call in the IA32 ISA are summarized below:

Input Values

Register AX=0xd04f

Register EBX=0x50524f3 ("PROC")

Register ECX=0x4d4f445 ("MODE")

Register ESI=0

Register EDI=0

Registers SS:ESP=pointer to a stack area of minimum of 512 bytes

Output Values

Register AX=0x49413634 (IA64 OS) or 0x49413332 (IA32 OS)

Register ESI==0x50524f3 ("PROC")

Register EDI=0x4d4f445 ("MODE")

Carry Flag=clear

On receipt of the CAB value (Register AX in the above implementation), method 500 generates 530 a corresponding boot request and executes 534 the code block(s) returned in response to the boot request. If the CAB indicates 540 the OS is in the native ISA, the code block includes a code segment in the second ISA that loads OS code in the first ISA. In this case, method 500 jumps 544 to an entry point for the returned native ISA OS and boots 550 the OS. For an IA32 NOC, this jump may be implemented by executing an INT 15 function call to request transition to the IA64 ISA. Parameters for this function call are summarized below:

Register AX=0xd04f

Register EBX=0x454e5452 ("ENTER")

Register ECX=0x434f4445 ("CODE")

Register ESI=pointer to the IA_32_BIOS_Register_State

Register SS:ESP=pointer to a stack area of minimum of 512 bytes

If the CAB indicates 540 that a non-native OS was returned, e.g. an OS in the second ISA, the returned OS is booted in the current mode.

The present invention thus provides a flexible mechanism for booting a computer system through a network. When a network boot is indicated, the network controller retrieves an indication of the operating system to be booted from the system firmware, e.g. BIOS, and generates a boot request that specifies the indicated operating system. If the indicated operating system is written in an ISA different from that supported by the network controller, the requested operating system is transferred using code in the ISA supported by the network controller. The processor is then switched to a different IAS mode, and control is handed to the requested operating system.

Persons skilled in the art of processor design and having the benefit of this disclosure will recognize variations and modifications of the disclosed embodiments that fall within the spirit and scope of the present invention. For example, operating systems based on ISAs other than IA32 and IA64 may be booted, and CAB information may be transferred between the NOC and system firmware through different mechanisms. The present invention may also be used to load code other than OS code from the network. For example, diagnostic, inventory, maintenance and various types of management code written for different ISAs may be downloaded using the disclosed mechanism. The full scope of the invention is limited only by the appended claims.

We claim:

1. A method for booting a computer from a network:

detecting a reset signal by the computer;

retrieving an indication of an operating system to be booted from a memory of the computer;

broadcasting to the network from the computer a boot request based on the indication; and loading into the memory of the computer a block of operating system code returned in response to the boot request.

2. The method of claim 1, wherein retrieving an indication comprises requesting a client architecture indicator from a firmware location.

3. The method of claim 2, wherein requesting a client architecture indicator comprises:

issuing a specified interrupt to a BIOS;

retrieving the client architecture indicator from the a response provided by the BIOS.

4. The method of claim 3, wherein broadcasting a boot request onto the network comprises:

incorporating the retrieved client architecture indicator into a broadcast request; and sending the broadcast request to one or more servers on the network.

5. The method of claim 1, further comprising:

reading a configuration file in response to the detected reset signal; and transferring control to a Network Option Card (NOC) specified by the configuration file.

6. The method of claim 5, wherein the NOC implements retrieving the indication and broadcasting the boot request.

7. The method of claim 1, wherein loading a block of OS code comprises:

receiving a code block in a first instruction set architecture (ISA);

executing the received code block to load a block of OS code in a second ISA; and transferring control to the OS code in the second ISA.

8. The method of claim 7, wherein the first ISA is IA32 and the second ISA is IA64.

9. A computer system comprising:

a processor to execute instructions;

a non-volatile memory including a first boot program which is executable by the processor in response to a reset signal; and a network controller to couple the computer system to a network, the network controller including a second boot program which is executable by the processor to:

retrieve a client architecture indicator from the non-volatile memory; and generate a boot request using the client architecture indicator.

10. The computer system of claim 9, wherein the non-volatile memory specifies the client architecture indicator and a device to provide an operating system for the computer system.

11. The computer system of claim 10, wherein the non-volatile memory specifies the network controller as the device to provide the operating system.

12. The computer system of claim 11, wherein the first boot program transfers control of the processor to the second boot program if the network controller is the device to provide the operating system.

13. The computer system of claim 12, wherein the computer system receives a block of code written in the first ISA in response to the boot request and the processor implements the code segment to load a block of operating system code written in the second ISA.

14. The computer system of claim 9, wherein the second boot program retrieves the client architecture indicator from the non-volatile memory using an interrupt.

15. The computer system claim 9, wherein the second boot program is written in a first instruction set architecture (ISA) and the client architecture indicator specifies an operating system written in a second ISA.

16. An article comprising:

a machine readable medium on which are stored instructions, executable by a processor to implement a method for loading an operating system onto a computer from a network, the method comprising:

retrieving a client architecture indicator from a non-volatile memory of the computer;

generating a boot request message that includes the client architecture indicator for the computer; and issuing the boot request message through a network transceiver of the computer.

17. The machine readable medium of claim 16, wherein retrieving the client architecture indicator comprises:

generating an interrupt to a BIOS in the non-volatile memory to request the client architecture indicator; and extracting the client architecture indicator from a response to the interrupt.

18. The machine readable medium of claim 17, the boot request indicates an operating system to be loaded from the network.

19. The machine readable medium of claim 18, wherein the stored instructions are written in a first ISA and the indicated operating system is written in a second ISA.

* * * * *